United States Patent
Kwon et al.

(10) Patent No.: US 9,648,157 B2
(45) Date of Patent: May 9, 2017

(54) MOBILE TERMINAL AND METHOD OF CONTROLLING INFORMATION PUBLICATION VIA A WEBSITE IN A MOBILE TERMINAL

(75) Inventors: Arim Kwon, Seoul (KR); Moonju Kim, Gyeonggi-do (KR); Suyeon Song, Seoul (KR); Yunmi Kwon, Seoul (KR); Hyemi Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 813 days.

(21) Appl. No.: 13/196,665

(22) Filed: Aug. 2, 2011

(65) Prior Publication Data

US 2012/0047208 A1  Feb. 23, 2012

(30) Foreign Application Priority Data

Aug. 17, 2010  (KR) .................. 10-2010-0079213

(51) Int. Cl.
*H04M 1/725* (2006.01)
*G06Q 50/00* (2012.01)
(Continued)

(52) U.S. Cl.
CPC .... *H04M 1/72577* (2013.01); *G06F 17/3087* (2013.01); *G06Q 50/01* (2013.01);
(Continued)

(58) Field of Classification Search
CPC ......... H04M 1/72572; H04M 1/72577; H04M 1/72566; G06Q 50/01
(Continued)

(56) References Cited

U.S. PATENT DOCUMENTS

| | | | |
|---|---|---|---|
| 2003/0140090 A1* | 7/2003 | Rezvani | H04L 41/22 709/203 |
| 2007/0255831 A1 | 11/2007 | Hayashi et al. | |
| 2008/0036653 A1 | 2/2008 | Huston | |
| 2009/0299957 A1* | 12/2009 | Ledlie | G06F 17/30899 |

FOREIGN PATENT DOCUMENTS

| | | |
|---|---|---|
| CN | 1885836 | 12/2006 |
| CN | 101043745 | 9/2007 |

(Continued)

*Primary Examiner* — Luat Phung
*Assistant Examiner* — Saad A Waqas
(74) *Attorney, Agent, or Firm* — Lee, Hong, Degerman, Kang & Waimey

(57) ABSTRACT

A mobile terminal and a method of a mobile terminal controlling information publication via a website are disclosed. According to one embodiment, a mobile terminal includes: a wireless communication unit for accessing a social networking service (SNS) website; a user input unit for receiving an input of information to be published at the accessed SNS website; a position location module for obtaining a current position of the mobile terminal; and a controller for: determining whether the obtained current position is located within a specific location area; preventing publication of the input information at the accessed SNS website if it is determined that the obtained current position is located within the specific location area; and allowing publication of the input information if it is determined that the obtained current position is not located within the specific location area.

14 Claims, 24 Drawing Sheets

(51) Int. Cl.
 *H04W 4/20* (2009.01)
 *H04L 29/08* (2006.01)
 *G06F 17/30* (2006.01)
 *H04W 4/02* (2009.01)
(52) U.S. Cl.
 CPC ............ *H04L 67/02* (2013.01); *H04W 4/021* (2013.01); *H04W 4/206* (2013.01); *H04M 1/72566* (2013.01); *H04M 1/72572* (2013.01)
(58) Field of Classification Search
 USPC .......................................................... 709/204
 See application file for complete search history.

(56) References Cited

U.S. PATENT DOCUMENTS

| | | | | |
|---|---|---|---|---|
| 2010/0279708 | A1* | 11/2010 | Lidsrom | H04W 4/02 455/456.1 |
| 2011/0264246 | A1* | 10/2011 | Pantoja | G06Q 30/02 700/92 |
| 2013/0104246 | A1* | 4/2013 | Bear | H04L 63/10 726/28 |
| 2013/0285855 | A1* | 10/2013 | Dupray | G01S 19/48 342/451 |

FOREIGN PATENT DOCUMENTS

| | | |
|---|---|---|
| CN | 101242444 | 8/2008 |
| JP | 2002074049 A | 3/2002 |
| JP | 2004328130 A | 11/2004 |
| JP | 2009265771 A | 11/2009 |
| KR | 1020060082354 A | 7/2006 |
| WO | 2008043993 | 4/2008 |

* cited by examiner

MOBILE TERMINAL AND METHOD OF CONTROLLING INFORMATION PUBLICATION VIA A WEBSITE IN A MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2010-0079213, filed on Aug. 17, 2010, the contents of which are hereby incorporated by reference herein in their entirety.

FIELD OF THE INVENTION

The present invention relates to a mobile terminal, and, more particularly, to a mobile terminal and a method of controlling information publication via a website in a mobile terminal. Although features disclosed herein are suitable for a wide scope of applications, they are particularly suitable for uploading and publicizing information by accessing a website that provides a social networking service (SNS).

DISCUSSION OF THE RELATED ART

Generally, terminals can be classified into mobile/portable terminals and stationary terminals. The mobile terminals can be classified into handheld terminals and vehicle mounted terminals according to the manner of portability with respect to a user.

As functions of terminals become increasingly diversified, terminals may be implemented as a multimedia player provided with composite functions such as capturing of photos or moving pictures, playback of music or moving picture files, game play, and broadcast reception. To support these terminal functions, improvement of structural and/or software components of the terminal may be considered.

Generally, in a mobile terminal capable of accessing and uploading information to a social networking service (SNS) site, if specific information is uploaded to the SNS site via the mobile terminal, the uploaded information is published or made public in real time and reveals personal information such as the position or location of the mobile terminal. Because the information uploaded via the mobile terminal is published or made available to all SNS site users irrespective of their positions or locations, the uploaded information may be spread indiscreetly.

SUMMARY

Accordingly, embodiments of the present invention are directed to a mobile terminal and a method of a mobile terminal controlling information publication via a website that substantially obviate one or more problems posed by limitations and disadvantages of the related art.

One aspect of the present invention is directed toward a mobile terminal and a method of a mobile terminal controlling information publication via a website, in which publication of information uploaded in real time to a social networking services (SNS) site by a user terminal located within a specific location area via the SNS site is suspended until the user terminal is no longer located within the specific location area.

Another aspect of the present invention is directed toward a mobile terminal and a method of a mobile terminal controlling information publication via a website, in which publication of information previously uploaded to an SNS site by a user terminal located within a specific location area via the SNS site is restricted until the user terminal is no longer located within a user-specified location area.

A further aspect of the present invention is directed to provide a mobile terminal and a method of a mobile terminal controlling information publication via a website, in which information previously uploaded to an SNS site by a user terminal is published only to SNS site users located within a specific location area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to one embodiment, a mobile terminal includes: a wireless communication unit for accessing a social networking service (SNS) website; a user input unit for receiving an input of information to be published at the accessed SNS website; a position location module for obtaining a current position of the mobile terminal; and a controller for: determining whether the obtained current position is located within a specific location area; preventing publication of the input information at the accessed SNS website if it is determined that the obtained current position is located within the specific location area; and allowing publication of the input information if it is determined that the obtained current position is not located within the specific location area.

According to one embodiment, a mobile terminal includes: a wireless communication unit for accessing a social networking service (SNS) website; a position location module for obtaining a current position of the mobile terminal; and a controller for: determining whether information previously uploaded to the accessed SNS website corresponds to a specific area location within which the obtained current position is located; preventing the previously uploaded information from being published at the accessed SNS website if it is determined that the previously uploaded information corresponds to the specific area location; and allowing the previously uploaded information to be published at the accessed SNS website if it is determined that the previously uploaded information does not correspond to the specific area location.

According to one embodiment, a mobile terminal includes: a wireless communication unit for accessing a social networking service (SNS) website and uploading information to the accessed SNS website; and a controller for instructing the accessed SNS website to provide the uploaded information for publication only to one or more terminals located in a specific location area.

According to one embodiment, a method of a mobile terminal controlling information publication at a social networking service (SNS) website includes: accessing the SNS website; receiving input information to be published at the accessed SNS website; determining whether a current position of the mobile terminal is located within a specific location area; preventing publication of the input information at the accessed SNS website if it is determined that the current position is located within the specific location area; and allowing publication of the publication-suspended input information if it is determined that the current position is not located within the specific location area According to one embodiment, a method of a mobile terminal controlling information publication at a social networking service (SNS) website includes: accessing the SNS website; determining whether information previously uploaded to the accessed SNS website corresponds to a specific area location within which a current position of the mobile terminal is located; preventing the previously uploaded information from being published at the accessed SNS website if it is determined that the previously uploaded information corresponds to the specific area location; and allowing the previously uploaded information to be published at the accessed SNS website if it is determined that the previously uploaded information does not correspond to the specific area location.

According to one embodiment, a method of a mobile terminal controlling information publication at a social networking service (SNS) website includes: accessing the SNS website; uploading information to the accessed SNS website; and restricting publication of the uploaded information at the accessed SNS website to only at least one terminal located in a specific location area.

It is to be understood that both the foregoing general description and the following detailed description of aspects and features of the present invention are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain aspects and features of the invention. In the drawings.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

Mobile terminals described in this disclosure can include a mobile phone, a smart phone, a laptop computer, a digital broadcast terminal, a PDA (personal digital assistant), a PMP (portable multimedia player), and a navigation system. Except where applicable to a mobile terminal only, it will be appreciated by those skilled in the art that features described herein may also be applicable to a stationary terminal such as a digital TV or a desktop computer.

Figure 1:
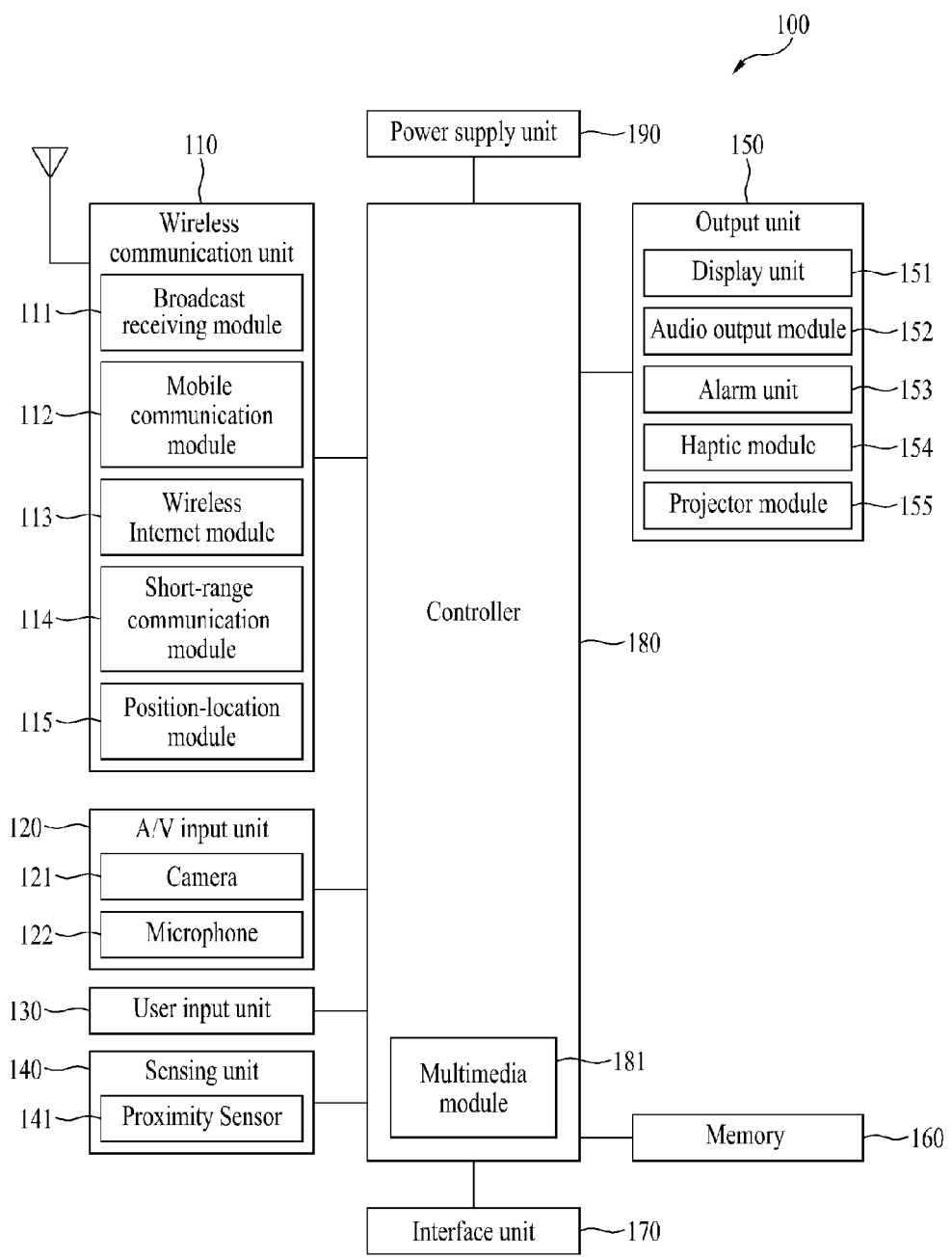
FIG. 1 is a block diagram of a mobile terminal according to one embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 as having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and/or a terrestrial channel.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal and/or broadcast associated information received by the broadcast receiving module 111 may be stored in a suitable device, such as the memory 160.

The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), DVB-H, the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The mobile communication module 112 transmits/receives wireless signals to/from one or more network entities (e.g., a base station, an external terminal, and/or a server). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi™, Wibro™ (Wireless broadband), Wimax™ (World Interoperability for Microwave Access), and HSDPA (High Speed Downlink Packet Access).

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module.

The audio/video (A/V) input unit 120 is configured to provide an audio or video signal input to the mobile terminal 100. As shown, the A/V input unit 120 includes a camera 121 and a microphone 122. The camera 121 receives and processes or produces image frames of still pictures or video, which are obtained by an image sensor in a video call mode or a photographing mode. Furthermore, the processed image frames can be displayed on the display unit 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition mode. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a jog wheel, a jog switch and a touchpad that utilizes, e.g., static pressure/capacitance.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components, such as a display and keypad, of the mobile terminal, a change of position or location of the mobile terminal or a component of the mobile terminal, a presence or absence of user contact with the mobile terminal, and an orientation or acceleration/deceleration of the mobile terminal.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display unit 151, an audio output module 152, an alarm unit 153, a haptic module 154, and a projector module 155.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display unit 151 may be implemented using known display technologies. These technologies include a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented as a transparent or optical transmittive type, i.e., a transparent display. A representative example of the transparent display is the TOLED (transparent OLED). A rear configuration of the display unit 151 can be implemented as the optical transmittive type as well. In this configuration, a user may be able to see an object located at the rear of a terminal body on a portion of the display unit 151 of the terminal body.

At least two display units 151 can be provided in the mobile terminal 100 in accordance with one embodiment. For instance, a plurality of display units 151 can be arranged to be spaced apart from each other or to form a single body on a single face of the mobile terminal 100. Alternatively, a plurality of display units 151 can be arranged on different faces of the mobile terminal 100.

If the display unit 151 and a sensor for detecting a touch action (hereinafter called 'touch sensor') is configured as a mutual layer structure (hereinafter called 'touchscreen'), the display unit is usable as an input device as well as an output device. In this case, the touch sensor can be configured as a touch film, a touch sheet, or a touchpad.

The touch sensor can be configured to convert pressure applied to a specific portion of the display unit 151 or a variation of capacitance generated from a specific portion of the display unit to an electronic input signal. Moreover, the touch sensor is configurable to detect pressure of a touch as well as a touched position or size.

If a touch input is made to the touch sensor, signal(s) corresponding to the touch input are transferred to a touch controller. The touch controller processes the signal(s) and then transfers the processed signal(s) to the controller 180. Therefore, the controller 180 is made aware when a prescribed portion of the display unit 151 is touched.

Referring to FIG. 1, a proximity sensor 141 can be provided at an internal area of the mobile terminal 100 enclosed by the touchscreen or around the touchscreen. The proximity sensor is a sensor that detects a presence of an object approaching a prescribed detecting surface or an object existing or located around the proximity sensor using an electromagnetic field strength or infrared ray without mechanical contact. Hence, the proximity sensor 141 may be more durable than a contact type sensor and also may have utility broader than the contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and/or an infrared proximity sensor. The touchscreen may include an electrostatic capacity proximity sensor configured to detect the proximity of a pointer using a variation of an electric field according to the proximity of the pointer. In this configuration, the touchscreen or touch sensor can be considered as the proximity sensor 141.

In the following description, for purposes of clarity, an action in which a pointer approaches the touchscreen without contacting the touchscreen is referred to as a 'proximity touch'. Furthermore, an action in which a pointer actually touches the touchscreen is referred to as a 'contact touch'. The position on the touchscreen that is proximity-touched by the pointer refers to the position of the pointer which vertically opposes the touchscreen when the pointer performs the proximity touch.

The proximity sensor detects a proximity touch and a proximity touch pattern, such as a proximity touch distance, a proximity touch duration, a proximity touch position, or a proximity touch shift state. Information corresponding to the detected proximity touch action and the detected proximity touch pattern can be output to the touchscreen.

The audio output module 152 functions in various modes, including a call-receiving mode, a call-placing mode, a recording mode, a voice recognition mode, and a broadcast reception mode, in order to output audio data which is received from the wireless communication unit 110 or is stored in the memory 160. During operation, the audio output module 152 outputs audio relating to a particular function such as receiving a call or receiving a message. The audio output module 152 may be implemented using one or more speakers, buzzers and other audio producing devices, or combinations thereof.

The alarm unit 153 outputs a signal for announcing the occurrence of a particular event associated with the mobile terminal 100. Typical events include a received call, a received message and a received touch input. The alarm unit 153 is able to output a signal for announcing the event occurrence by way of vibration as well as a video or audio signal. The video or audio signal can be output via the display unit 151 or the audio output module 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or output in sequence.

The haptic module 154 is able to generate various tactile effects as well as vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hold/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with one embodiment.

The projector module 155 is an element for performing an image projector function using the mobile terminal 100. The projector module 155 is able to display an image, which is identical to or at least partially different from the image displayed on the display unit 151, on an external screen or wall according to a control signal of the controller 180.

In particular, the projector module 155 can include a light source (not shown in the drawing) that generates light, such as a laser, for projecting an external image, an image producing means (not shown in the drawing) for producing an external image to project the light generated from the light source, and a lens (not shown in the drawing) for enlarging the external image according to a predetermined focus distance. Furthermore, the projector module 155 can further include a device (not shown in the drawing) for adjusting an image projection direction by mechanically moving the lens or the entire projector module.

The projector module 155 can be a CRT (cathode ray tube) module, an LCD (liquid crystal display) module, or a DLP (digital light processing) module according to a device type. In particular, the DLP module is operated by enabling the light generated from the light source to reflect on a DMD (digital micro-mirror device) chip and can be advantageous for reducing the size of the projector module 155.

Preferably, the projector module 155 can be provided in a lengthwise direction of a lateral, front or rear direction of the mobile terminal 100. However, it is understood that the projector module 155 can be provided in any portion of the mobile terminal 100 as deemed necessary or appropriate.

The memory 160 is generally used to store various types of data to support the processing, control, and storage requirements of the mobile terminal 100. Examples of such data include program instructions for applications operating in the mobile terminal 100, contact data, phonebook data, messages, audio, still pictures, and moving pictures. Furthermore, a recent use history or a cumulative use frequency of each piece of data, such as use frequency for each phonebook, each message or each multimedia file, can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory, such as SD memory or XD memory, or other similar memory or data storage device. Furthermore, the mobile terminal 100 may operate in association with a web storage for performing a storage function of the memory 160 on the Internet.

The interface unit 170 is often implemented to couple the mobile terminal 100 with external devices. The interface unit 170 receives data from the external devices or is supplied with power and then transfers the data or power to the respective elements of the mobile terminal 100 or enables data within the mobile terminal to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with power from the cradle or a passage for delivering various command signals, which are input from the cradle by a user, to the mobile terminal. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs control and processing associated with voice calls, data communications, and video calls. The controller 180 may include a multimedia module 181 that provides multimedia playback. The multimedia module 181 may be configured as part of the controller 180 or implemented as a separate component. Moreover, the controller 180 is able to perform a pattern recognizing process to recognize a writing input and a picture drawing input performed on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or a combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 according to embodiments of the present invention can include at least one of the components illustrated in FIG. 1. Moreover, according to particular embodiments, the mobile terminal 100 accesses a website providing a social networking service (SNS), such as an SNS website or an SNS site, and then uploads specific information to the SNS site. For instance, the SNS site can include a site such as Facebook™ or Twitter™.

Figure 2:
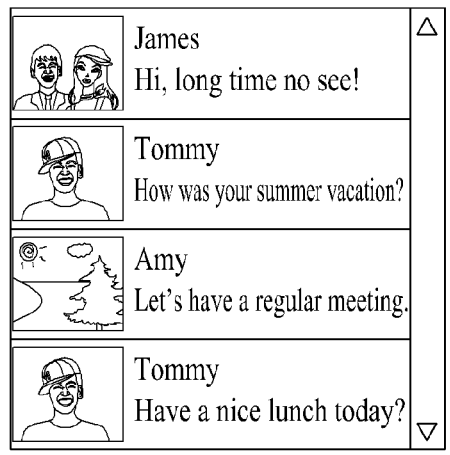
FIG. 2 illustrates a screen configuration for accessing an SNS site.

FIG. 2 illustrates a screen configuration for accessing an SNS site using a mobile terminal 100. For purposes of clarity, it is understood that a user of the mobile terminal 100 is previously registered as a user of the SNS site. The user may access the SNS site using any Internet terminal as well as the mobile terminal 100 and may then be able to upload information. Moreover, if a separate authentication or registration procedure is required for accessing the SNS site and uploading information via the mobile terminal 100, it is understood that the corresponding authentication or registration procedure has already been completed.

Referring to FIG. 2, as the SNS site is accessed, the mobile terminal 100 displays information uploaded by other SNS site users as well as information uploaded by the user of the mobile terminal 100. Therefore, the user is able to upload information to the SNS site in real time using the mobile terminal 100. Furthermore, the user is also able to check or view information uploaded by other SNS site users in real time. For instance, the uploaded information can include a text, an image, and/or a website address, such as a URL.

Information related to the uploaded information can be displayed together with the uploaded information. For instance, the related information can include identity information, such as an ID, a nickname, an email address, a name, or an image, of the user who uploaded the corresponding information, a time at which the corresponding information was uploaded, and/or a position or a location from which the corresponding information was uploaded. The information uploaded to the SNS site and registration information of the user of the SNS site can be managed by being stored in an SNS management server.

A method of controlling publication of information on a website according to embodiments of the present invention will now be described with reference to the accompanying drawings. A method of controlling publication of information via or on a website according to one embodiment of the present invention will be described with reference to FIGS. 3 to 10.

Figure 3:
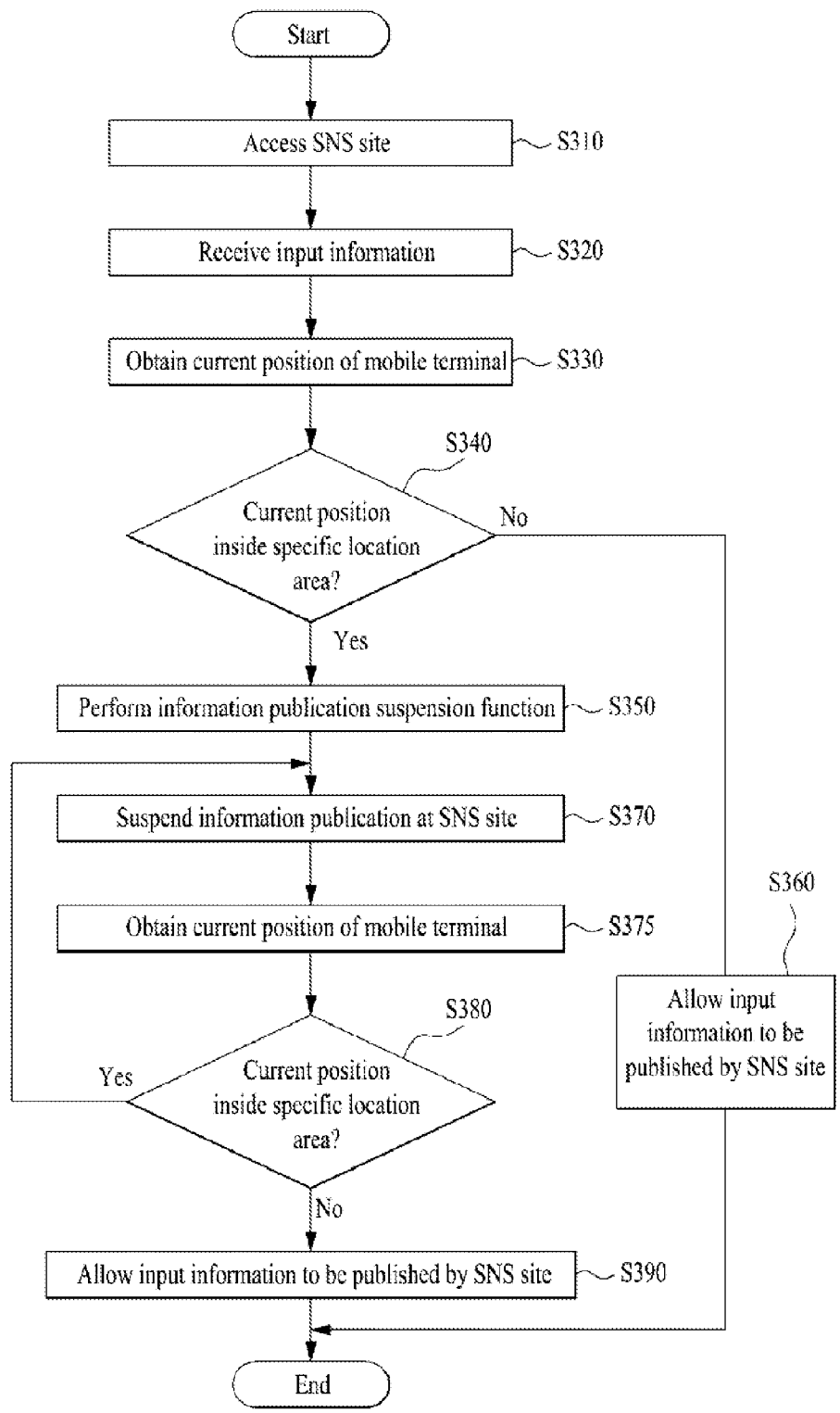
FIG. 3 is a flowchart of a method of controlling information publication via a website in a mobile terminal according to one embodiment of the present invention.

Referring to the flowchart of FIG. 3, the mobile terminal 100 accesses an SNS site using the wireless communication unit 110 under the control of the controller 180 [S310]. In particular, the mobile terminal 100 may access the SNS site using the wireless Internet module 113. It will be appreciated that a user of the mobile terminal 100 is previously registered as a user of the accessed SNS site.

The mobile terminal 100 may access the SNS site in response to receiving from the user an ID and a password that were previously registered with the SNS site. Alternatively, the mobile terminal 100 may access the SNS site using an ID and a password stored in the mobile terminal 100.

The mobile terminal 100 receives information input by the user using the user input 130 [S320]. The information is to be publicized, such as by being published or made public, at the accessed SNS site. If the mobile terminal 100 includes a touchscreen, the mobile terminal displays a virtual keypad on the touchscreen. The mobile terminal 100 may receive the input information via a manipulation or operation of the virtual keypad.

The mobile terminal 100 obtains its current position or location using the position-location module 115 under the control of the controller 180 [S330]. The mobile terminal 100 may obtain its current position periodically or at a specific point in time as requested by the user. Alternatively, the mobile terminal 100 may obtain its current position when it accesses the SNS site or receives information to be published at the accessed SNS site. The mobile terminal 100 may obtain its current position using coordinates information of the mobile terminal received from GPS satellites or using a position of a neighbor base station, such as by using the distance and direction of the neighbor base station relative to the mobile terminal.

In FIG. 3, obtaining the current position [S330] is performed after the input information is received [S320]. However, it is understood that, according to alternative embodiments, a different order may be followed.

The mobile terminal 100 determines whether the obtained current position is inside a specific location area under the control of the controller 180 [S340]. The specific location area can include at least a specific place, such as a place that is displayable as point of interest (POI) information, a specific building, a specific company, a specific shop, a specific store, a specific address, or a range of locations located within a predetermined distance from a specific location.

The specific location area may be designated or chosen by a user or may be randomly designated by the mobile terminal 100. Furthermore, the specific location area may be designated to include a greater area, such as a vicinity area, around which the mobile terminal 100 is currently located.

If it is determined that the obtained current position is inside the specific location area, the mobile terminal 100 performs an information publication suspension function under the control of the controller 180 in order to suspend information publication [S350]. Publication of the input information is then suspended if the obtained current position is inside the specific location area. As will be described in more detail later, if it is determined that a later-obtained current position is not inside the specific location area, the information, which was not published earlier, can then be published at the SNS site.

If the information publication suspension function has been previously set or configured by a user of the mobile terminal 100 for execution if the obtained current position is inside the specific location area, the information publication suspension function can be executed. Alternatively, the information publication suspension function can be executed if an execution command is input by the user at the time the SNS site is accessed or at the time information is input, such as for later publication at the SNS site. Alternatively, the information publication suspension function can be executed if the input information [S320] meets a specific condition. These features are described in more detail later with reference to FIGS. 4 to 8D.

The setting or configuration of the information publication suspension function is explained with reference to FIGS. 4 to 6C. With reference to FIGS. 4 to 6C, it is assumed that no restrictions are placed on when the information publication suspension function can be set. Furthermore, it is assumed that the information publication suspension function can be set at any point in time.

FIGS. 4 to 6C illustrate screen configurations for setting the information publication suspension function via search menus according to embodiments of the present invention.

Figure 4:
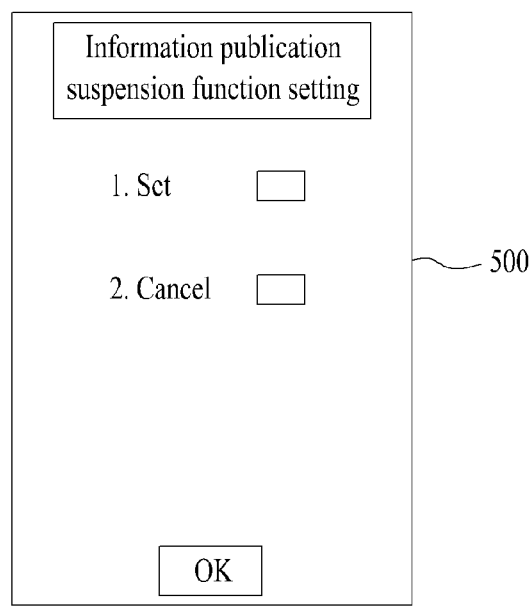
FIGS. 4, 5A, 5B, 5C, 6A, 6B and 6C illustrate screen configurations illustrating for setting an information publication suspension function via search menus according to embodiment(s) of the present invention.

Referring to FIG. 4, if a user selects a menu item corresponding to the information publication suspension function via search menus, the mobile terminal 100 displays a screen 500 for enabling the user to select whether to set the information publication suspension function. If the user selects 'Set' in the screen 500 of FIG. 4, the mobile terminal 100 sets the information publication suspension function. Accordingly, the information publication suspension function is performed to suspend publication of information input for upload to an SNS site if a current position of the terminal is inside a specific location area. If, however, the user selects 'Cancel' in the screen 500 of FIG. 4, the mobile terminal 100 cancels the previously set information publication suspension function.

Figure 5A:
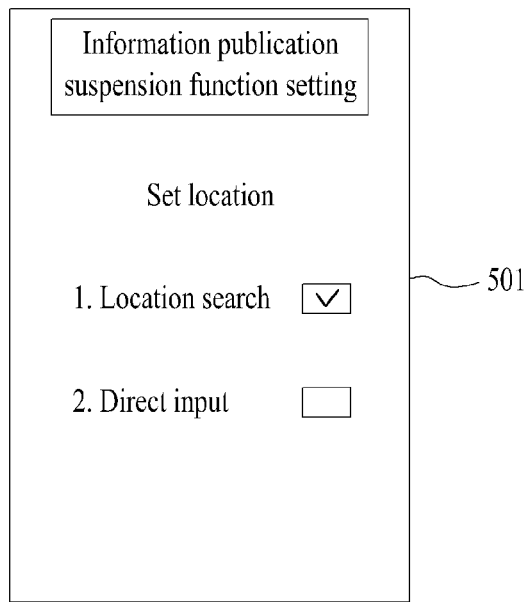
Figure 5B:
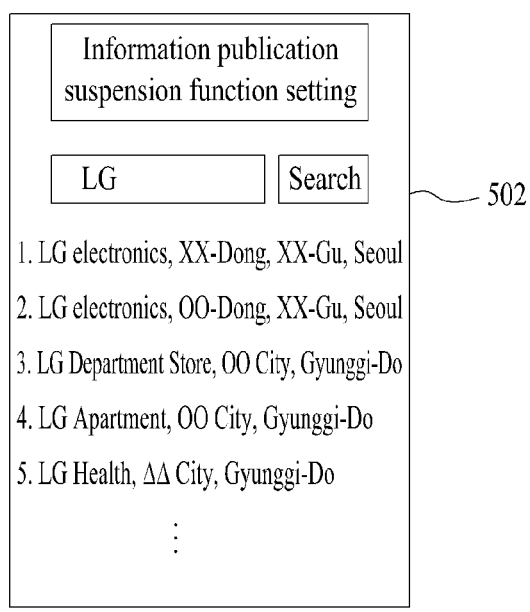
Figure 5C:
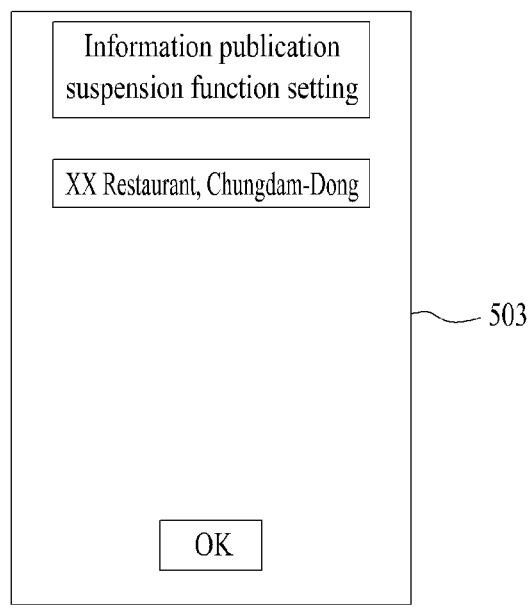

Referring to FIGS. 5A to 5C, if the user selects to set the information publication suspension function, the mobile terminal 100 sets a location area for executing the information publication suspension function according to user selection. Accordingly, depending on whether a current position of the mobile terminal 100 is inside the set location area, the mobile terminal 100 determines whether to execute the information publication suspending function. In particular, the set location area can correspond to the specific location area that was described earlier.

If the user selects 'Location search' in the screen 501 of FIG. 5A, the mobile terminal 100 displays a list including location areas corresponding to a location search string, such as "LG," input by the user, as illustrated by screen 502 of FIG. 5B. For instance, the location areas corresponding to the location search string may include a location area having a name that includes the location search string. Referring to FIG. 5B, the mobile terminal 100 may set the location area, according to which the information publication suspension function will be performed, to a specific location area selected by the user from the list shown in screen 502.

Referring back to FIG. 5A, if the user selects 'Direct input' in the screen 501, the mobile terminal 100 may receive an input of information identifying a specific location area, such as a name, an image, or POI information, from the user. The mobile terminal may then set the location area, according to which the information publication suspension function will be performed, to a specific location area corresponding to the information input by the user, as illustrated by screen 503 of FIG. 5C.

The selection of one location area for execution of the information publication suspension function has been described. Furthermore, it is understood that more than one specific location area may be selected by the user.

Figure 6A:
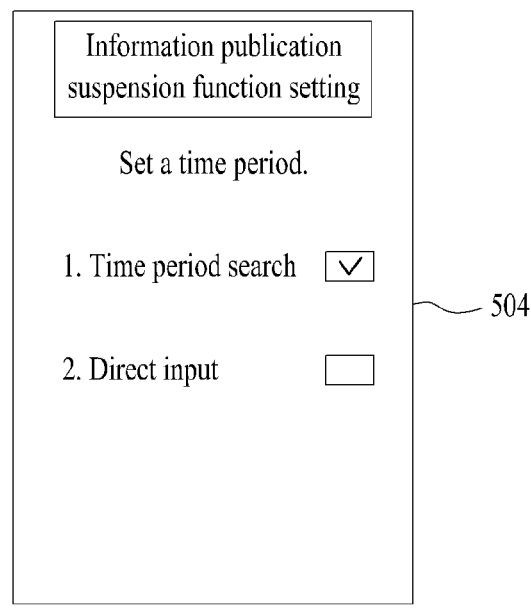
Figure 6B:
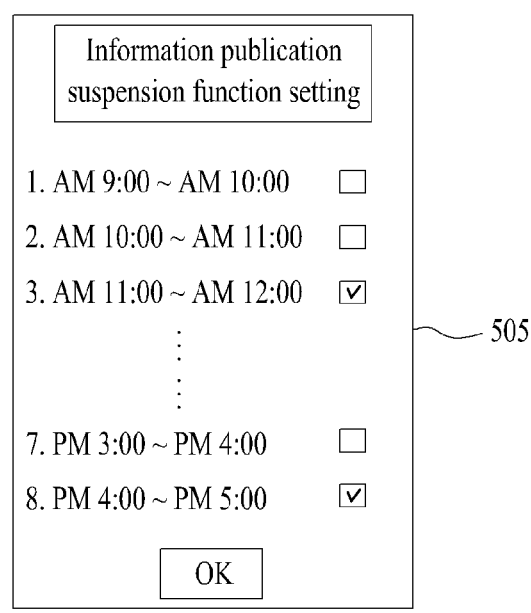
Figure 6C:
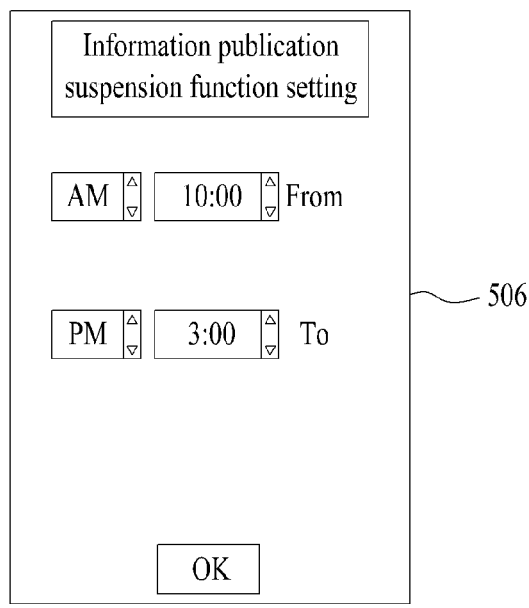

Referring to FIGS. 6A to 6C, if the user selects to set the information publication suspension function, the mobile terminal 100 may also set a time period for executing the information publication suspension function according to the user selection. Accordingly, depending on whether the current time is within a set time period or time window, the mobile terminal 100 can determine whether to execute the information publication suspension function.

If the user selects 'Time period search' in the screen 504 of FIG. 6A, the mobile terminal 100 displays a list of time periods, as illustrated by screen 505 of FIG. 6B. Referring to FIG. 6B, the mobile terminal 100 sets the time period(s) for executing the information publication suspension function according to a specific time period(s) selected by the user from the list shown in the screen 505.

Referring back to FIG. 6A, if the user selects 'Direct input' in the screen 504, the mobile terminal 100 may receive an input of a specific time period from the user and may then set the time period for executing the information publication suspension function according to the input time period, as illustrated by screen 506 of FIG. 6C. It is understood that more than one time period may be selected according to user selection, as illustrated by FIG. 6B.

Execution of an information publication suspending function will be described in more detail with reference to FIGS. 7A to 8D. For purposes of clarity, it is understood that the mobile terminal 100 has received input information to be published at the SNS site while the mobile terminal is accessing or is in communication with the SNS site.

FIGS. 7A to 8C are views of screen configurations illustrating the initiation of execution or operation of an information publication suspending function upon receipt of input information according to embodiments of the present invention.

Figure 7A:
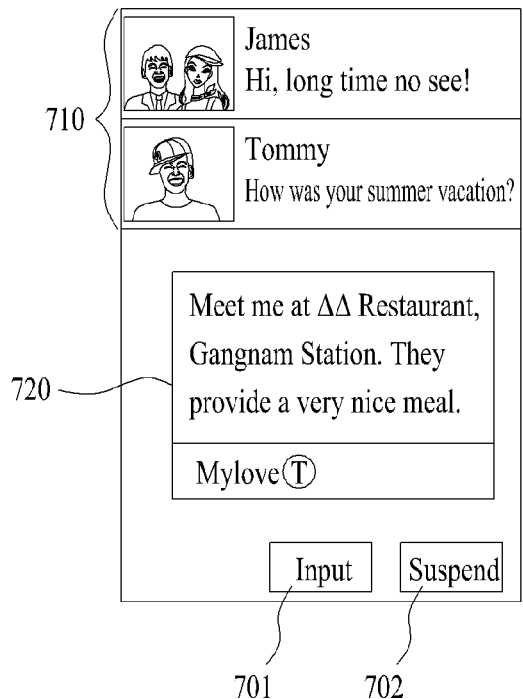
FIGS. 7A, 7B, 7C, 8A, 8B 8C and 8D illustrate screen configurations for setting an information publication suspension function in response to an information input according to embodiment(s) of the present invention.
Figure 7B:
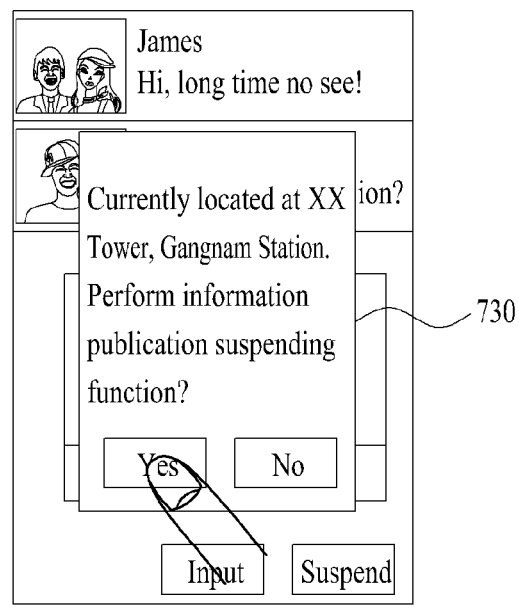

Referring to FIG. 7A and FIG. 7B, after information has been input via an information input window 720, the mobile terminal 100 displays a location window 730 if the user further selects an 'Input' soft key 701. The location window 730 provides information regarding a specific location area, such as xx Tower at Gangnam Station, in which the mobile terminal 100 is currently located. Further, the location window 730 enables the user to select whether to execute an information publication suspension function. If the user selects the 'Yes' soft key 703, the mobile terminal 100 executes the information publication suspension function while the current position of the mobile terminal is inside the xx Tower at Gangnam Station.

Alternatively, if the user selects the 'Suspend' soft key 702, the mobile terminal 100 automatically executes the information publication suspension function while the current position of the mobile terminal is inside 'xx Tower at Gangnam Station'. As such, the mobile terminal 100 need not display a window similar to the location window 730 for inquiring whether to execute the information publication suspension function.

Figure 7C:
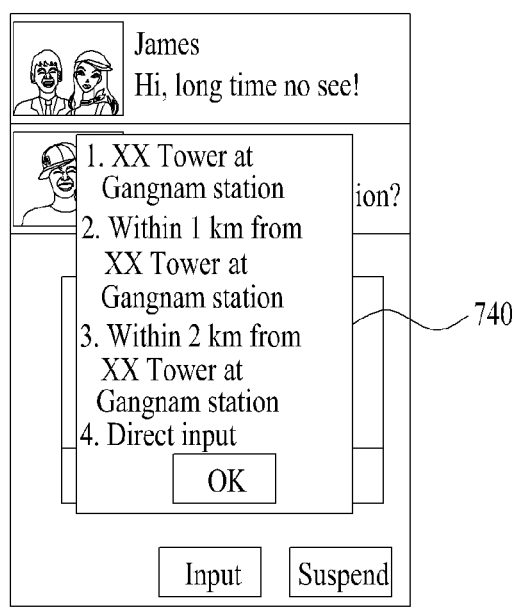

Referring to FIG. 7C, if the user selects either the 'Suspend' soft key 702 (see FIG. 7A) or the 'Yes' soft key 703 in the location window 730 (see FIG. 7B), the mobile terminal 100 displays a list 740 of selectable location areas with reference to a specific location area, such as xx Tower at Gangnam Station, in which the mobile terminal 100 is currently located. For instance, the location area list 740 can include 'XX Tower at Gangnam Station', 'Within 1 km from XX Tower at Gangnam Station', and 'Within 2 km from XX Tower at Gangnam Station'.

If the user selects 'XX Tower at Gangnam Station' from the location area list 740, the mobile terminal 100 executes the information publication suspension function when the current position is inside the XX Tower at Gangnam Station. If the user selects 'Within 1 km from XX Tower at Gangnam Station' from the location area list 740, the mobile terminal 100 executes the information publication suspension function when the current position is within a 1-kilometer (1 km) range from the XX Tower at Gangnam Station.

Figure 8A:
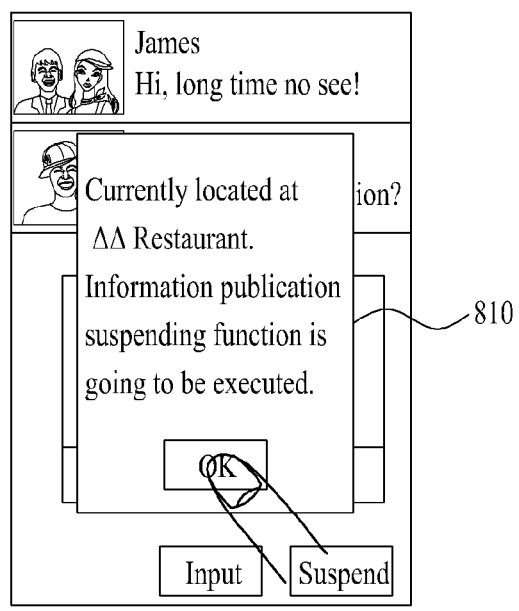
Figure 8B:
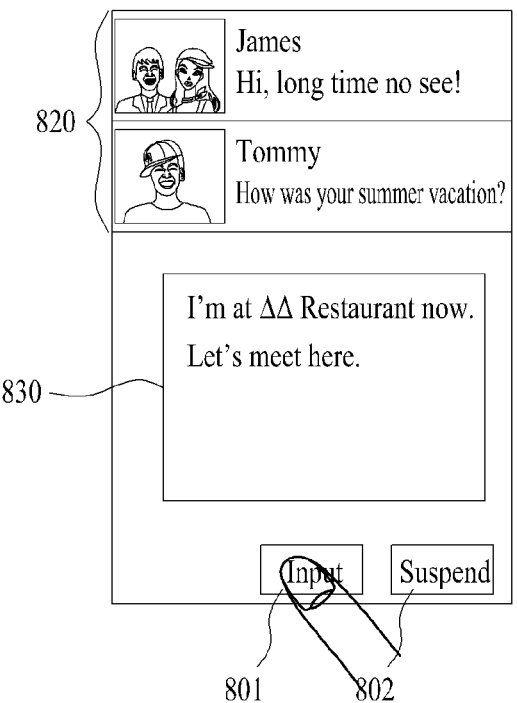

Referring to FIG. 8A and FIG. 8B, if the input information includes information related to a specific location area in which the mobile terminal 100 is currently located, as illustrated by window 720 of FIG. 7A, or the input information specifically identifies the current position as the current position, as illustrated by window 830 of FIG. 8B, the mobile terminal 100 performs an information publication suspension function while the current position is inside the specific location area, such as a building, a shop, or an administrative address.

For instance, if the input information is 'Meet me at ΔΔ Restaurant, Gangnam Station' and the specific location area in which the current position is located is 'ΔΔ Restaurant, Gangnam Station', the input information is regarded as including information related to the specific location area in which the current position is located. Moreover, if the input information is 'I am at ΔΔ Restaurant, Gangnam Station now', the input information is regarded as including the current position 'ΔΔ Restaurant, Gangnam Station'.

Figure 8C:
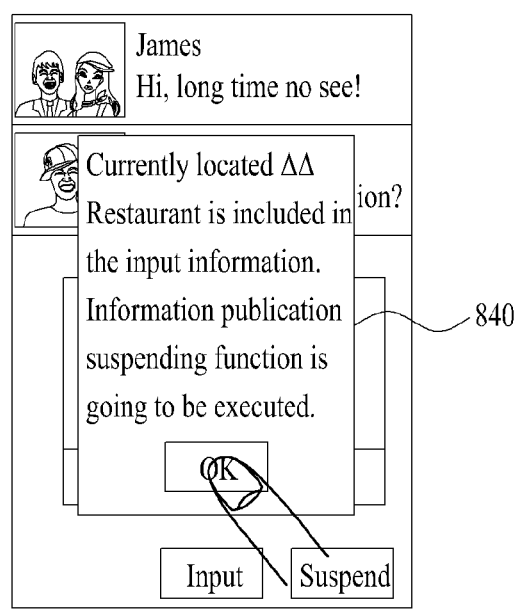

In either of the above situations, the mobile terminal 100 displays a window, such as window 810 of FIG. 8A or window 840 of FIG. 8C, to inform the user that the information publication suspension function is to be executed. In either situation, if the user selects the 'OK' soft key, such as 'OK' soft key of the window 810, 840, the mobile terminal 100 displays a list 850 of selectable location areas with reference to a specific location area, such as ΔΔ Restaurant, Gangnam Station, in which the current position is located, as illustrated by FIG. 8D.

Figure 8D:
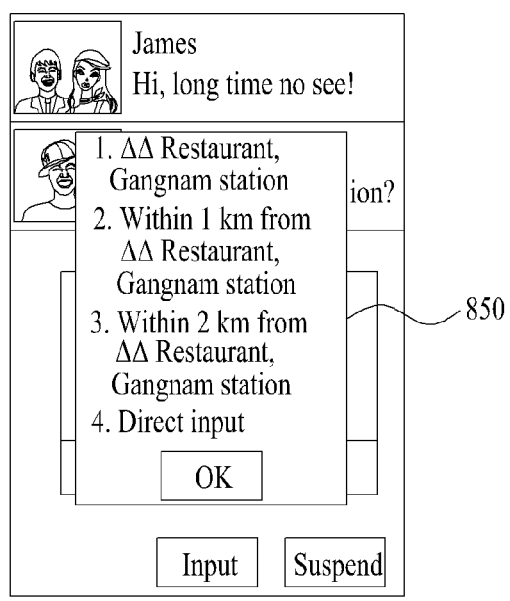

Referring to FIG. 8D, the location area list 850 can include 'ΔΔ Restaurant, Gangnam Station', 'Within 1 km from ΔΔ Restaurant, Gangnam Station' and 'within 2 km from ΔΔ Restaurant, Gangnam Station'. As previously described with respect to FIG. 5A, the user may also directly input a particular location area.

Therefore, if 'ΔΔ Restaurant, Gangnam Station' is selected from the location area list 850, the mobile terminal 100 performs the information publication suspension function while the current terminal position is located inside 'ΔΔ Restaurant, Gangnam Station'. Alternatively, if 'Within 1 km from ΔΔ Restaurant, Gangnam Station' is selected from the location area list 850, the mobile terminal 100 performs the information publication suspension function while the current terminal position is located within a 1 km range of the 'ΔΔ Restaurant, Gangnam Station'.

Referring back to FIG. 3, if the obtained current terminal position is determined not to be in the specific location area [S340], the mobile terminal 100 allows the input information to be published by the accessed SNS site under the control of the controller 180 [S360]. Therefore, users of the SNS site are able to view the information, which was input using the mobile terminal 100 [S320], via the SNS site.

If the information publication suspension function is performed [S350], the mobile terminal suspends the publication of the input information at the accessed SNS site under the control of the controller 180 [S370]. According to particular embodiments, the suspension function is performed only if the current terminal position is inside the specific location area.

Regarding the suspension of information publication [S370], according to one embodiment, the mobile terminal 100 suspends an upload of the input information to the SNS site. According to an alternative embodiment, the mobile terminal 100 uploads the input information to the SNS site and then makes a request that publication of the input information be suspended.

The mobile terminal 100 obtains its current position or updates its current position [S375]. The mobile terminal 100 determines whether its current position is inside the specific location area under the control of the controller 180 [S380]. The determination can be performed periodically, at a specific point in time requested by the user, or in real time. The determination [S380] is identical, or substantially identical, to the previous determination [S340], and, therefore, will not be described in further detail.

If it is determined that the current position of the terminal is not inside the specific location area, the mobile terminal 100 allows the previously suspended information [S370] to be published at the accessed SNS site under the control of the controller 180 [S390].

The suspension of information publication [S370] and resumption of information publication [S390] will now be explained in more detail with reference to FIGS. 9A to 10. For purposes of clarity, it is assumed that an information publication suspension function was previously set. Also, it is assumed that 'ΔΔ Restaurant' was previously set as a specific location area within which the information publication suspension function is to be performed. Also, it is assumed that the current position is 'ΔΔ Restaurant' and the mobile terminal 100 performs the information publication suspension function.

Figure 9A:
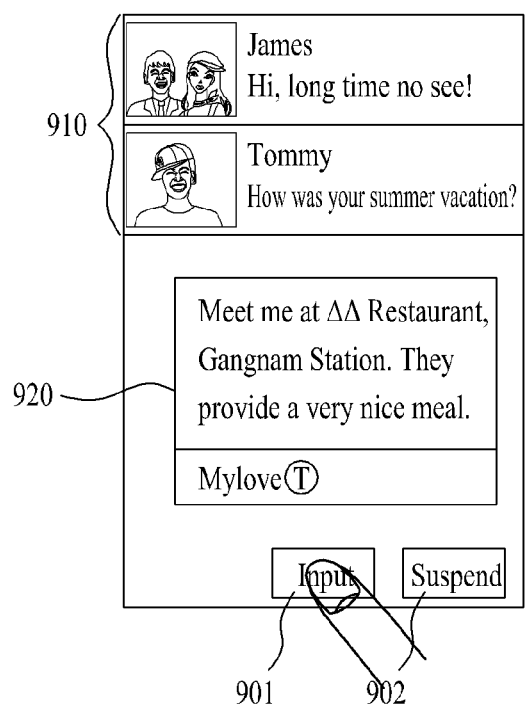
FIGS. 9A, 9B, 9C, 9D, 9E and 10 illustrate screen configurations for setting a process for suspending information publication according to embodiment(s) of the present invention.
Figure 10:
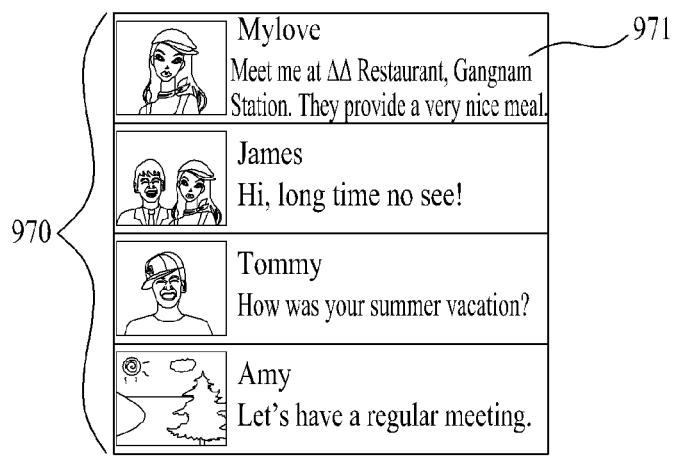

Referring to FIG. 9A, while a current position is 'ΔΔ Restaurant', the mobile terminal 100 receives an input of information for publication via a currently accessed SNS site, as illustrated by box 920. Other information is published, as illustrated by box 910. The mobile terminal 100 receives a selection of an 'Input' soft key 901 from the user. As the 'Input' soft key 901 is selected, the input information can be uploaded to the SNS site.

Figure 9B:
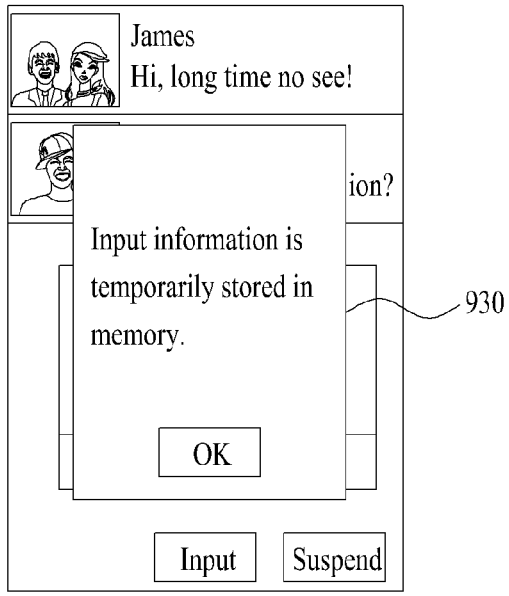

Referring to FIG. 9B, if the information publication suspension function is performed, the mobile terminal 100 may enable the input information to be stored in the memory 160, under the control of the controller 180. The user is informed that the input information is stored, as illustrated by box 930. Accordingly, an upload of the input information to the SNS site is suspended while the current position is in 'ΔΔ Restaurant'.

Figure 9C:
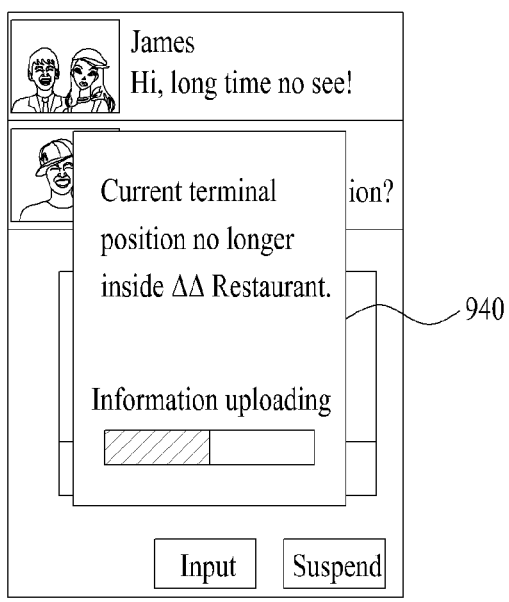

Referring to FIG. 9C, if it is later determined that the then-current position is no longer in 'ΔΔ Restaurant', such as when the mobile terminal 100 is moved to be outside the ΔΔ Restaurant, the mobile terminal 100 uploads the input information stored in the memory 160 to the currently accessed SNS site under the control of the controller 180. The user is informed that the input information is uploaded, as illustrated by box 940. As illustrated by FIG. 10, the uploaded information 971 is published via the currently accessed SNS site.

Figure 9D:
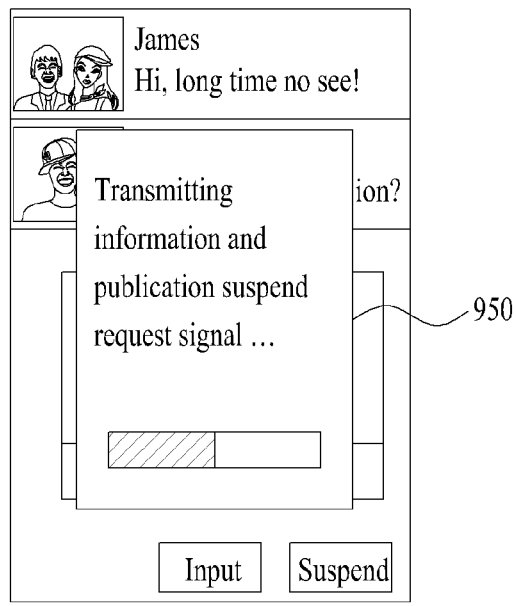

Referring to FIG. 9D, if the information publication suspension function is performed, the mobile terminal 100 may transmit the input information and a publication suspension request signal corresponding to the input information to the currently accessed SNS site. The user is informed that the input information and the publication suspension request signal are transmitted, as illustrated by box 950. Because the publication suspension request signal is transmitted, the uploaded information may not be published via the SNS site while the information publication suspension function is performed or under operation.

Figure 9E:
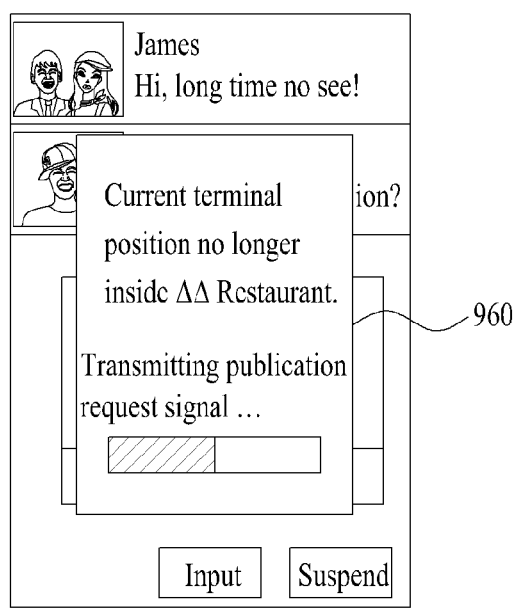

Referring to FIG. 9E, if it is later determined that the then-current position is no longer in 'ΔΔ Restaurant', the mobile terminal 100 transmits a publication request signal corresponding to the transmitted input information to the currently accessed SNS site under the control of the controller 180. The user is informed that the publication request signal is transmitted, as illustrated by box 960. As illustrated by FIG. 10, the previously-transmitted information 971, of which publication via the SNS site was previously suspended, can be published via the currently accessed SNS site when the publication request signal is transmitted.

Figure 11:
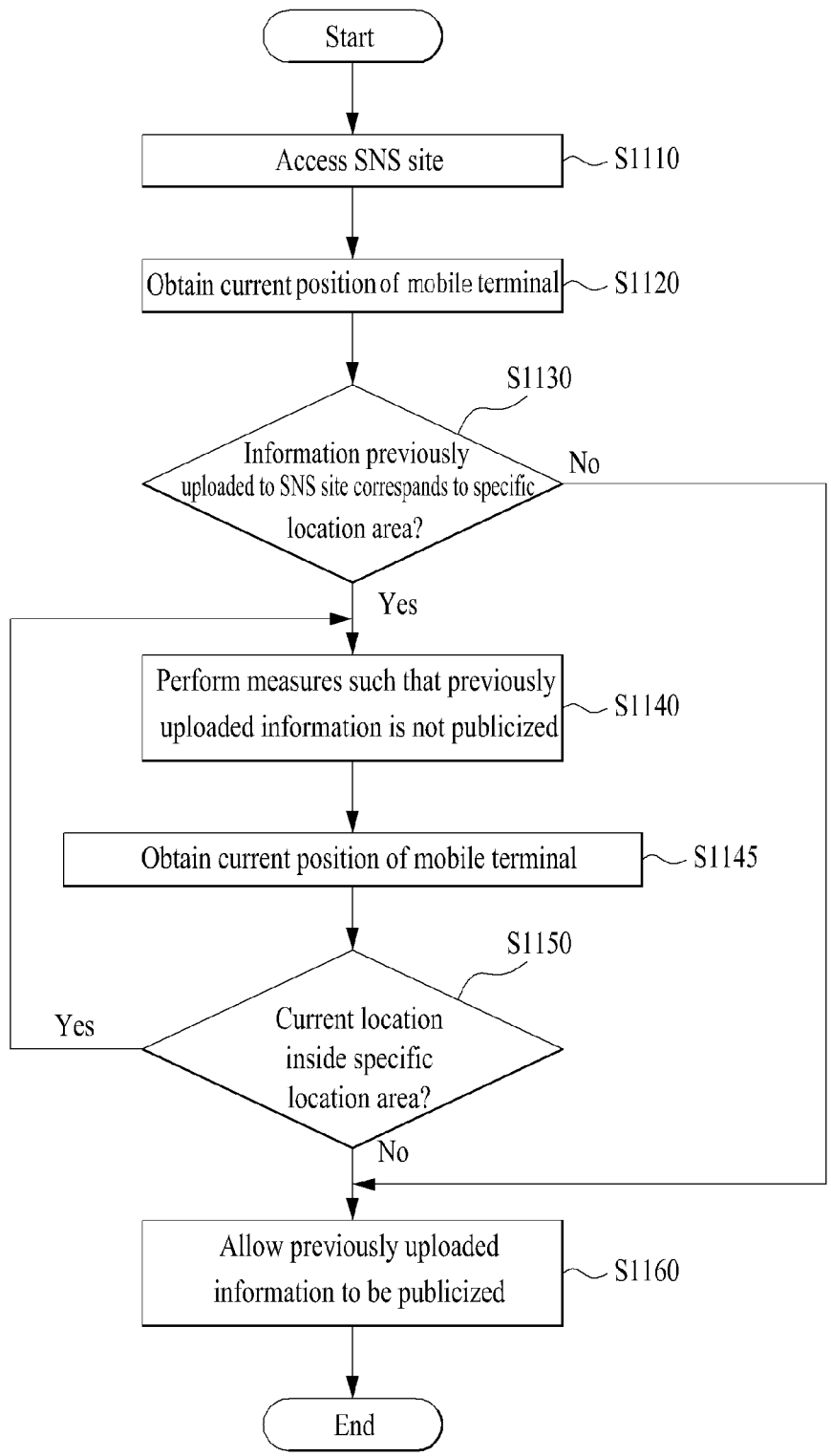
FIG. 11 is a flowchart of a method of controlling information publication via a website in a mobile terminal according to one embodiment of the present invention.

A method of controlling publication of information via or on a website in a mobile terminal 100 according to another embodiment of the present invention will be described with reference to FIGS. 11 to 14B. Referring to FIG. 11, the mobile terminal 100 accesses an SNS site using the wireless communication unit 110 under the control of the controller 180 [S1110]. Accessing the SNS site [S1110] may be substantially identical to the accessing illustrated by box S310 of FIG. 3, which was described earlier with reference to FIG. 3. Therefore, accessing the SNS site [S1110] will not be described in further detail.

The mobile terminal 100 obtains its current position or location using the position location module 115 under the control of the controller 180 [S1120]. Obtaining the current position [S1120] may be substantially identical to the obtaining illustrated by box S320 of FIG. 3, which was described earlier with reference to FIG. 3. Therefore, obtaining the current position [S1120] will not be described in further detail.

The determination of a presence or absence of previously uploaded information corresponding to a specific location area and a corresponding restriction on information publication can be performed if an information publication suspension function is executed. Accordingly, if there exists information previously uploaded to an SNS site corresponding to a specific location area, in which the current position of the mobile terminal 100 is located, the information publication suspension function is performed such that the publication of the previously uploaded information via the SNS site is prevented from occurring while the current position is in the specific location area.

The information publication suspension function can be previously set via search menus. Moreover, at least a specific location area or a specific time period for performing the information publication suspension function can be set in advance. The information publication suspension function and the specific location area or specific time period for performing the information publication suspension function can be set by a user using the user input unit 130.

Setting of the information publication suspension function has been described with reference to FIGS. 4 to 6C. Moreover, even if the information publication suspension function is not set in advance, the information publication suspension function may be set when an SNS site is accessed or information is input to the SNS site.

With continued reference to FIG. 11, the mobile terminal 100 determines whether there exists information previously uploaded to the accessed SNS site that corresponds to a specific location area in which the obtained current position is located, under the control of the controller 180 [S1130].

The specific location area may include at least a specific place, a specific building, a specific company, a specific shop, a specific store, a specific address, or a range of locations located within a predetermined distance from a specific position.

If it is determined that the previous information exists with respect to the specific location area in which the current position is located, the mobile terminal 100 performs suitable measures such that the previous information is not published, under the control of the controller 180 [S1140]. The mobile terminal 100 may suspend publication of all previously uploaded information while the mobile terminal is in the specific location and may also suspend publication of previously uploaded information that is related to the specific location area or previously uploaded information indicating the current position of the terminal.

The mobile terminal 100 obtains its current position or updates its current position [S1145]. The mobile terminal 100 determines whether the current position is located inside the specific location area, under the control of the controller 180 [S1150]. The determination can be performed periodically, at a specific point in time, at a user requested timing point, or in real time. The determination [S1150] is identical or substantially identical to the previous determination [S1130]. Therefore, the determination [S1150] will not be described in further detail.

If it is determined that the current position of the terminal is not in the specific location area, the mobile terminal 100 allows the publication of the previously uploaded information via the accessed SNS site, under the control of the controller 180 [S1160].

Performing the measures to prevent publication [S1140] and allowing publication of previously uploaded information [S1160] are now explained in further detail with reference to FIGS. 12A to 14B. For purposes of clarity, it is assumed that a specific location area, in which the current position is located, is 'ΔΔ Restaurant'.

Figure 12A:
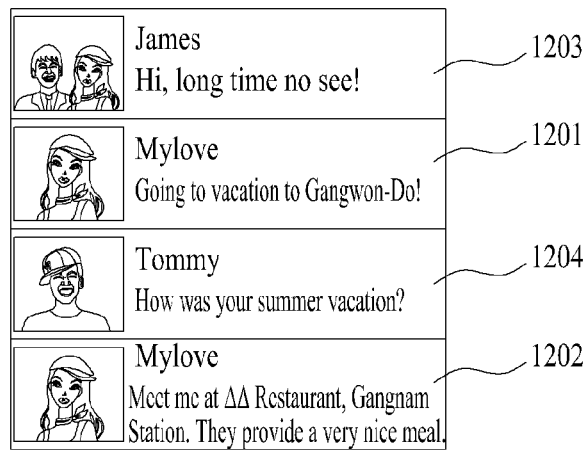
FIGS. 12A, 12B, 13A, 13B, 13C, 13D, 14A and 14B illustrate screen configurations for restricting publication of information previously uploaded according to embodiment(s) of the present invention.

FIGS. 12A to 14B illustrate screen configurations for restricting publication of previously uploaded information when the mobile terminal 100 is in a specific location area according to embodiments of the present invention. Referring to FIG. 12A, the mobile terminal 100 displays information published via an SNS site while the SNS site is accessed. The information published via the SNS site can include information 1201 and 1202 uploaded by a user of the mobile terminal 100 and information 1203 and 1204 uploaded by users of other mobile terminals.

Figure 12B:
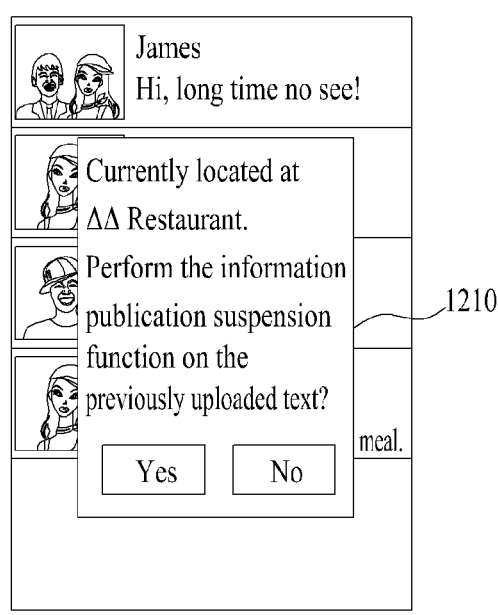

Referring to FIG. 12B, the mobile terminal 100 displays a window 1210 for enabling a user to select whether to perform an information publication suspension function on information that was previously uploaded to the SNS site that corresponds to 'ΔΔ Restaurant', inside which the current position of the mobile terminal is located.

If the 'Yes' soft key of window 1210 is selected, the information publication suspension function is performed on the information previously uploaded that corresponds to the 'ΔΔ Restaurant', inside which the current position of the mobile terminal 100 is located. It is understood that, if the information publication suspension function was set previously, then the information publication suspension function may be directly performed irrespective of whether the user selects the 'Yes' soft key.

Figure 13A:
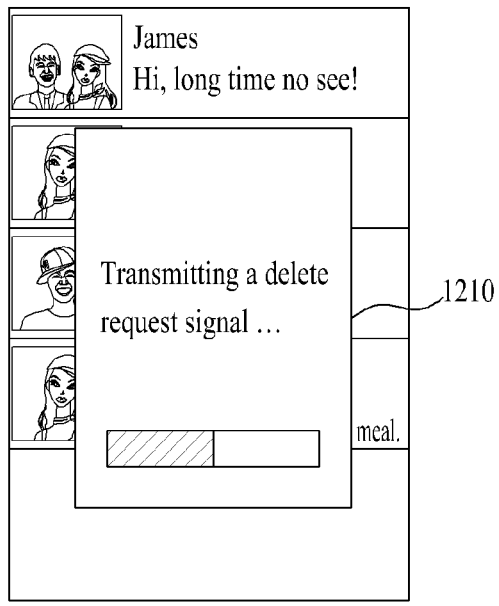
Figure 13B:
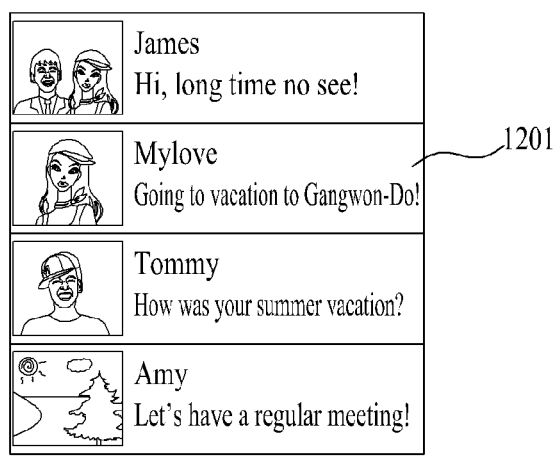

For purposes of clarity, it is assumed that an information publication suspension function is executed. Referring to FIG. 13A, the mobile terminal 100 transmits a delete request signal regarding the previously uploaded information to an SNS site using the wireless communication unit 110 under the control of the controller 180. Referring to FIG. 13B, in response to the transmission of the delete request signal, the previously uploaded information 1202 that corresponds to the 'ΔΔ Restaurant', which is the current location of the mobile terminal, is deleted from display by the SNS site and is not published via the SNS site.

Figure 13C:
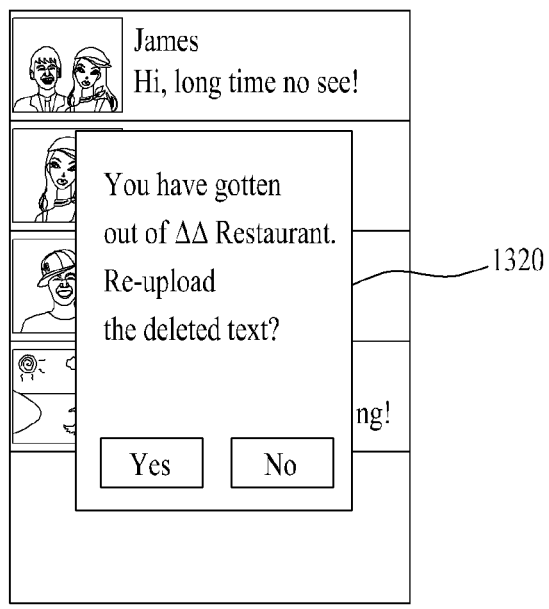

Referring to FIG. 13C, if it is determined that the current position of the mobile terminal 100 is not in the 'ΔΔ Restaurant' or not within a predetermined distance from the ΔΔ Restaurant, the mobile terminal may re-upload the previously deleted information to the SNS site under the control of the controller 180. The mobile terminal 100 may display a window 1320 to ask the user whether the information is to be re-uploaded. The previously deleted information may have been stored in the memory 160.

Figure 13D:
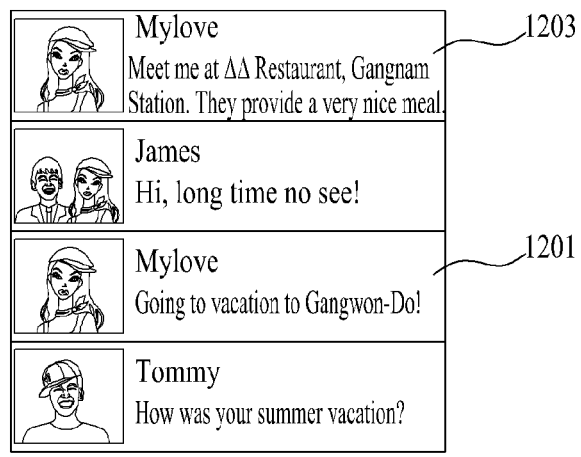

Referring to FIG. 13D, the same information or a duplicate 1203 of the previously deleted information 1202 is published via the SNS site. In doing so, the same information 1203 can be displayed with reference to an upload time of the same information instead of an upload time of the previously deleted information 1202.

Figure 14A:
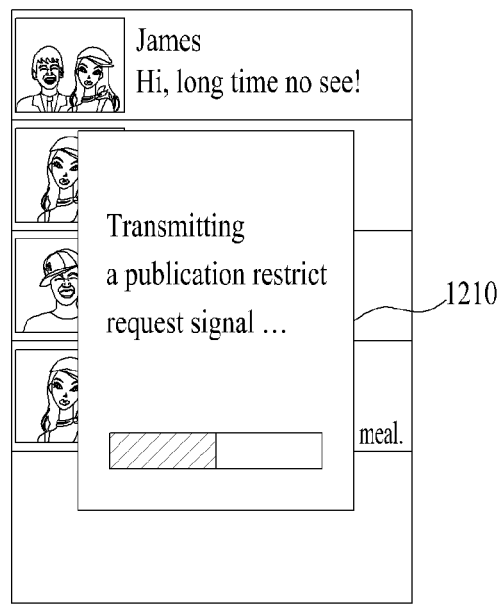

Alternatively, referring to FIG. 14A, the mobile terminal 100 may transmit a publication restrict request signal regarding the previously uploaded information to the SNS site via the wireless communication unit 110 under the control of the controller 180. In response to the transmission of the publication restrict request signal, the previously uploaded information 1202 that corresponds to the ΔΔ Restaurant, which is the current location of the mobile terminal 100, is deleted from display by the SNS site and is not published via the SNS site, as illustrated by FIG. 13B.

Figure 14B:
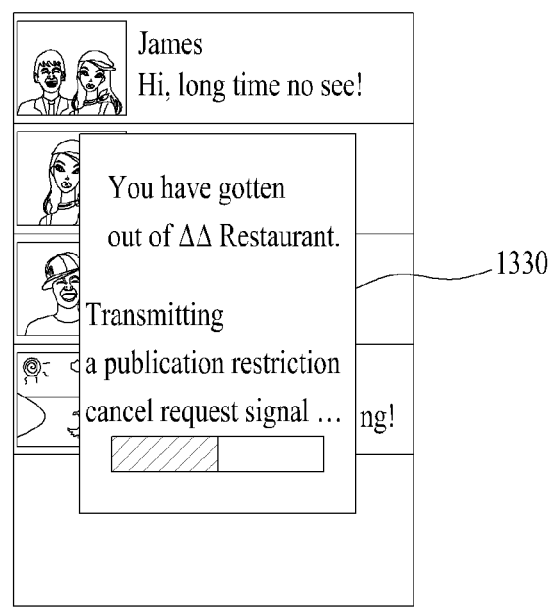

Referring to FIG. 14B, if it is determined under the control of the controller 180 that the current position is not in 'ΔΔ Restaurant' or not within a predetermined distance of the ΔΔ Restaurant, the mobile terminal 100 transmits a publication restriction cancel request signal regarding the previously deleted information to the SNS site via the wireless communication unit 110, as illustrated by window 1330. Therefore, the previously deleted information 1202 can be re-published via the SNS site, as illustrated by FIG. 12A. Because an upload timing point of the previously deleted information 1202 is not changed by the publication restriction request and the subsequent cancellation of the publication restriction request, the previous information can be displayed with reference to the upload time of the previously deleted information 1202 instead of a re-publication time of the previously deleted information.

A method of controlling information publication via a website in a mobile terminal 100 according to another embodiment of the present invention is explained with reference to FIGS. 15 to 16B.

Figure 15:
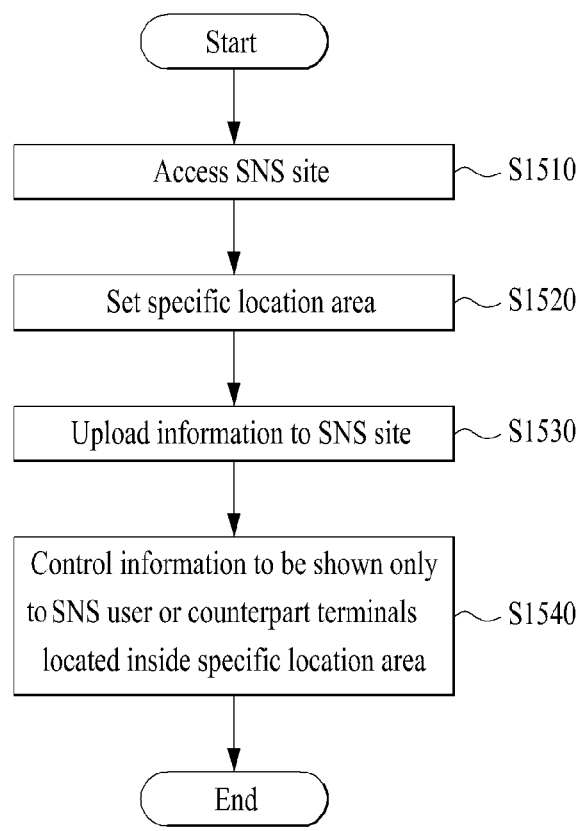
FIG. 15 is a flowchart of a method of controlling information publication via a website in a mobile terminal according to one embodiment of the present invention.

Referring to FIG. 15, the mobile terminal 100 accesses an SNS site using the wireless communication unit 110 under the control of the controller 180 [S1510]. Because accessing the SNS site [S1510] is identical or substantially identical to accessing illustrated by box S310 of FIG. 3, accessing the SNS site [S1510] will not described in further detail.

The mobile terminal 100 sets a specific location area to enable viewing of information uploaded to the accessed site under the control of the controller 180 [S1520]. Accordingly, users of the SNS site can view the information that was uploaded to the SNS site via the mobile terminal 100 only if the users are located in the set specific location area.

When setting the specific location area [S1520], the mobile terminal 100 sets a specific location area selected by a user via the user input unit 130 or sets a specific location area that meets a specific condition. The specific location area meeting the specific condition can include a location area in which a current position of the mobile terminal 100 is located. For instance, if the mobile terminal 100 is located at LG Tower, Yeoksam-Dong, Gangnam-Gu, Seoul, Korea, the location area in which the current position is located may include at least 'Korea', 'Seoul, Korea', 'Gangnam-Gu, Seoul, Korea', 'Yeoksam-Dong, Gangnam-Gu, Seoul, Korea' or 'LG Tower, Yeoksam-Dong, Gangnam-Gu, Seoul, Korea'.

The mobile terminal 100 uploads information input via the user input unit 130 to the accessed SNS site using the wireless communication unit 110 under the control of the controller 180 [S1530].

Afterwards, the uploaded information can be shown only to an SNS site user or a counterpart terminal, such as a mobile terminal 100 that provides information to the SNS site or views information, which is located in the specific area [S1540]. Therefore, the uploaded information may not be shown to SNS site users located in a location area other than the specific location area. For instance, if a specific location area is set with reference to a current position of the mobile terminal 100, the uploaded information may be shown to SNS site users located within the same building as the mobile terminal, within the same city as the mobile terminal, or in the same country as the mobile terminal.

The mobile terminal 100 may transmit a publication restrict request signal regarding the uploaded information to the SNS site via the wireless communication unit 110 under the control of the controller 180. Therefore, the uploaded information may not be shown to an SNS site user or a counterpart terminal that is not located in the specific location area according to the publication restrict request signal. This will be described in more detail with reference to FIG. 16A and FIG. 16B.

Figure 16A:
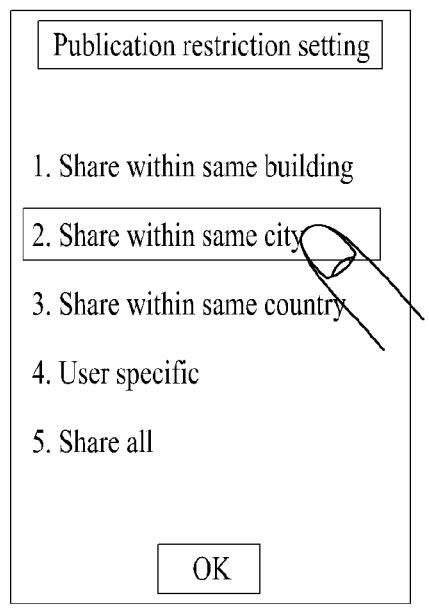
FIG. 16A and FIG. 16B illustrate screen configurations for setting an information publication target location area according to embodiment(s) of the present invention.
Figure 16B:
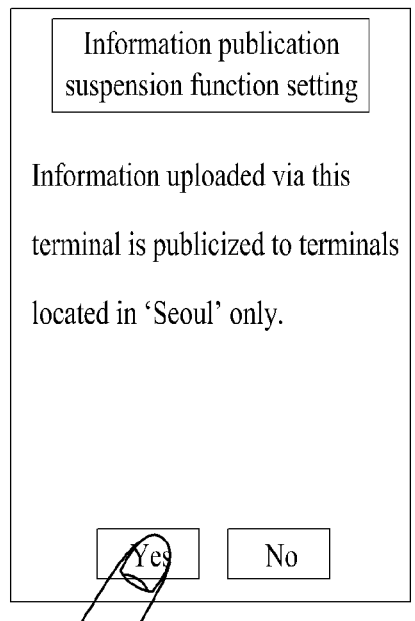

FIG. 16A and FIG. 16B illustrate screen configurations for setting an information publication target location area according to an embodiment of the present invention. Referring to FIG. 16A, in response to receiving a selection of a menu item corresponding to setting a location area for allowing information publication via search menus, the mobile terminal 100 displays a list of selectable location areas. The list of selectable location areas can include location areas with reference to a current position of the mobile terminal 100. In particular, the location areas can include 'within same building [as the terminal]', 'within same city [as the terminal]', or 'within same country [as the terminal]'.

If 'User specific' is selected from the location area list, a specific location area for allowing the information publication via SNS site is directly set according to user input. The specific location area may be set to be at least a specific building, a specific place, a specific company, a specific shop, a specific store, a specific address, or a range of locations located within a predetermined distance from a specific location. If 'Share all' is selected from the location area list, the information uploaded to the SNS site can be shown to all SNS site users without restriction regarding location areas.

Referring to FIG. 16B, if 'Share within same city' is selected from the location area list of FIG. 16A and the mobile terminal 100 is located in Seoul, the mobile terminal 100 controls the information uploaded via the mobile terminal 100 to be shown only to SNS site users or counterpart terminals located in Seoul.

Embodiments of the present invention provide various effects and/or features. According to particular embodiments, a mobile terminal may suspend publication of information, which is uploaded in real time to an SNS site by a terminal located in a specific location area, via the SNS site until the terminal is no longer located within the specific location area. This may prevent a current position of the terminal from being disclosed.

According to other embodiments, a mobile terminal may restrict publication of information, which was previously uploaded to an SNS site by a terminal located in a user-specified area, via the SNS site until the terminal is no longer located within the user-specified location area. This may prevent a current position of the terminal from being disclosed.

According to other embodiments, a mobile terminal may enable information, which was previously uploaded to an SNS site by the terminal, to be shown only to SNS site users located in a specific location area. This may prevent information from being indiscreetly disclosed.

The disclosed methods can be implemented in a program recorded medium as computer-readable codes. The computer-readable media may include all types of recording devices in which data readable by a computer system are stored. The computer-readable media may include ROM, RAM, CD-ROM, magnetic tapes, floppy discs, and optical data storage devices, and may also include carrier-wave type implementations, such as transmission via the Internet.

It will be apparent to those skilled in the art that various modifications and variations can be made in the present invention without departing from the spirit or scope of the present invention. Thus, it is intended that the present invention covers the modifications and variations of this invention provided they come within the scope of the appended claims and their equivalents.

What is claimed is:

1. A mobile terminal comprising:
a display; a memory configured to store information; a wireless communication unit configured to access a social networking service (SNS) website; a user input unit configured to receive inputs; a position location module configured to obtain a current position of the mobile terminal; and a controller configured to:
receive an input via the user input unit for presetting a specific location area; receive typed text data input via the user input unit, wherein the typed text data is to be published on the accessed SNS website;
determine whether the obtained current position is located within the specific location area; cause the display to display a notification notifying the current position when the obtained current position is determined to be located within the specific location area;
prevent publication of the received typed text data on the accessed SNS website and cause the memory to store the typed text data while the obtained current position is located within the specific location area, publication of the received typed text data allowed when the obtained current position is not located within the specific location area; cause the wireless communication unit to transmit the stored typed text data to the accessed SNS website for uploading and publication of the text data when the mobile terminal is no longer located within the specific location area;
cause deletion of information indicating the obtained current position, which was previously uploaded prior to publication to the SNS website, from the SNS website and cause the memory to temporarily store the deleted information when the obtained current position is located within the specific location area; and re-upload the temporarily stored information to the SNS website for publication when the mobile terminal is no longer located within the specific location area.

2. The mobile terminal of claim 1, wherein the preset specific location area includes an area associated with at least a place, a building, a company, a store, an address, or a range of locations located within a threshold distance from a specific position.

3. The mobile terminal of claim 1, wherein the displayed notification further notifies that an information publication prevention function is to be executed with respect to the specific location area when the obtained current position is determined to be located within the specific location area.

4. The mobile terminal of claim 3, wherein the controller is further configured to receive via the user input unit an input to set a specific time period for performing the information publication prevention function.

5. The mobile terminal of claim 1, wherein the controller is further configured to cause the display to display information informing that the text data is being uploaded.

6. The mobile terminal of claim 1, wherein the displayed notification asks whether to perform an information publication suspension function with respect to the previously uploaded information.

7. The mobile terminal of claim 6, wherein the controller is further configured to cause the display to display "Yes" and "No" keys in the notification to receive a response with regard to the information publication suspension function.

8. The mobile terminal of claim 7, wherein the controller is further configured to cause the wireless communication unit to transmit a delete request signal regarding the previously uploaded information to the SNS website in response to selection of the "Yes" key.

9. The mobile terminal of claim 7, wherein the previously uploaded information prior to publication is no longer displayed on the display in response to selection of the "Yes" key.

10. The mobile terminal of claim 1, wherein the controller is further configured to cause the display a second notification indicating that the obtained current position is determined to be no longer located within the specific location area.

11. The mobile terminal of claim 10, wherein the second notification asks whether to re-upload the deleted previously uploaded information.

12. The mobile terminal of claim 11, wherein the controller is further configured to cause the display to display "Yes" and "No" keys in the second notification to receive a response with regard to the re-uploading.

13. A method of controlling a mobile terminal for publishing information on a social networking service (SNS) website, the method comprising:
   accessing the SNS website; receiving an input for presetting a specific location area via a user input unit; receiving typed text data to be published on the accessed SNS website via the user input unit; obtaining a current position of the mobile terminal;
   determining whether the obtained current position is located within the specific location area; displaying a notification notifying the current position when the obtained current position is determined to be located within the specific location area;
   preventing publication of the typed text data on the accessed SNS website and storing the typed text data in a memory while the current position is located within the specific location area, publication of the received typed text data allowed when the obtained current position is not located within the specific location area;
   transmitting the stored typed text data to the accessed SNS website for uploading and publication of the text data when the mobile terminal is no longer located within the specific location area,
   causing deletion of information indicating the obtained current position, which was previously uploaded prior to publication to the SNS website, from the SNS website and temporarily storing the deleted information in the memory when the obtained current position is located within the specific location area; and
   re-uploading the temporarily stored information to the SNS website for publication when the mobile terminal is no longer located within the specific location area.

14. The method of claim 13, further comprising displaying information informing that the text data is being uploaded.

* * * * *